Sept. 1, 1936. G. O. WILMS ET AL Re. 20,094

ELECTRIC SWITCH

Original Filed Feb. 10, 1934 4 Sheets-Sheet 1

Inventors
Gustav O. Wilms
Albert J. Dawe
By Dechert Price & Rhoads
Attorneys

Sept. 1, 1936. G. O. WILMS ET AL Re. 20,094

ELECTRIC SWITCH

Original Filed Feb. 10, 1934 4 Sheets-Sheet 2

Inventors
Gustav O. Wilms
Albert J. Dawe
By Duhutton Jones
Attorneys

Sept. 1, 1936. G. O. WILMS ET AL Re. 20,094

ELECTRIC SWITCH

Original Filed Feb. 10, 1934 4 Sheets-Sheet 3

Inventors
Gustav O. Wilms
Albert J. Dawe
By Dunnett & Jones
Attorneys

Sept. 1, 1936. G. O. WILMS ET AL Re. 20,094

ELECTRIC SWITCH

Original Filed Feb. 10, 1934 4 Sheets-Sheet 4

Inventors
Gustav O. Wilms
Albert J. Dawe
By Lashmitt & Jones
Attorneys

Reissued Sept. 1, 1936

Re. 20,094

UNITED STATES PATENT OFFICE 20,094

ELECTRIC SWITCH

Gustav O. Wilms and Albert J. Dawe, Milwaukee, Wis., assignors to Allen-Bradley Company, Milwaukee, Wis., a corporation of Wisconsin Original No. 1,981,534, dated November 20, 1934, Serial No. 710,656, February 10, 1934. Application for reissue February 28, 1936, Serial No. 66,248

34 Claims. (Cl. 200—111)

This invention relates to improvements in electric switches and refers more particularly to electromagnetically actuated control switches.

Switches of this character may be divided into two classifications, those known as clapper type switches in which the movable contactors swing in an arc, and those known as solenoid type switches, in which the movable contactors move in a straight line toward and from the stationary contacts. This invention deals with the second type.

Heretofore, switches of this type were so constructed as to necessitate a large number of moving parts connected through linkage, cams, and other mechanical expedients, all of which were subject to a host of troubles brought on by improperly fitting bearings. This past design also required accurate and difficult lining up of coacting elements and units as the various parts of the switch were generally separately mounted upon an insulating base or panel.

Another disadvantage of past constructions was their inherent inability to meet the growing demand for reduction in size without entailing a restriction in the wiring space within the cabinet.

With these and other objections to past and existing switches of the character described in mind, it is an object of this invention to provide an electromagnetically operable switch of exceptional compactness, which is so designed and constructed that no mechanical linkage of any type is employed and no lining up of cooperating units is necessary during the final assembly.

This general object of the invention is obtained through the use of an integral part of the electromagnet to mount and support all of its associated mechanism. This integral part of the electromagnet is of the same general configuration as the magnet per se so as to save space and afford the greatest strength. It serves as the supporting base or frame for the entire structure and is so shaped and constructed as to provide space and mounting means at its top for the switch contacts, valves or other devices, which the magnet is designed to operate, and space at its sides for switches or relays such as overload protection relays, and thus ties the entire structure together into a compact unit.

Another object of this invention is to provide an electromagnet so designed as to afford the optimum of magnetic efficiency and of such mechanical construction as to facilitate machining of the parts to afford a good surface to surface contact between the faces of the armature and the magnet.

Another object of this invention is to provide an electromagnet construction in which common means are provided to hold the solenoid coil assembled with the laminated field piece and to guide the armature for its movement through the coil.

Another important object of this invention resides in the provision of a switch having an even number of stationary contacts and an even number of movable contacts, with the movable contacts mounted in pairs and balanced against each other, and in which the movable contacts move in a straight line during closing and opening of the switch.

A further object of this invention is to provide a switch of the character described wherein the movable contactor unit is carried directly by a vertically movable plunger type armature and wherein the armature and the contactor unit form the only moving elements and move in a straight line.

Another object of this invention is to provide a novel manner of mounting the stationary contacts wherein a single integral member of insulating material provides a mounting for all of the stationary contacts, affords arc suppressing chambers which have an arc quenching effect as disclosed in Patent No. 1,804,729, issued to Gustav O. Wilms and Frederick F. Loock, and provides a terminal board for the switch.

Another object of this invention is to provide a switch of the character described having a multiple break in each line obtained without in any wise complicating the design or adding structural elements.

Another object of this invention is to insure greater freedom of action by arranging the only movable elements of the switch for movement along the center line of the magnet and armature.

With the above and other objects in view which will appear as the description proceeds, our invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, we have illustrated one complete example of the physical embodiments of our invention constructed according to the best mode as we have so far devised for the practical application of the principles thereof, and in which.

Figure 1:
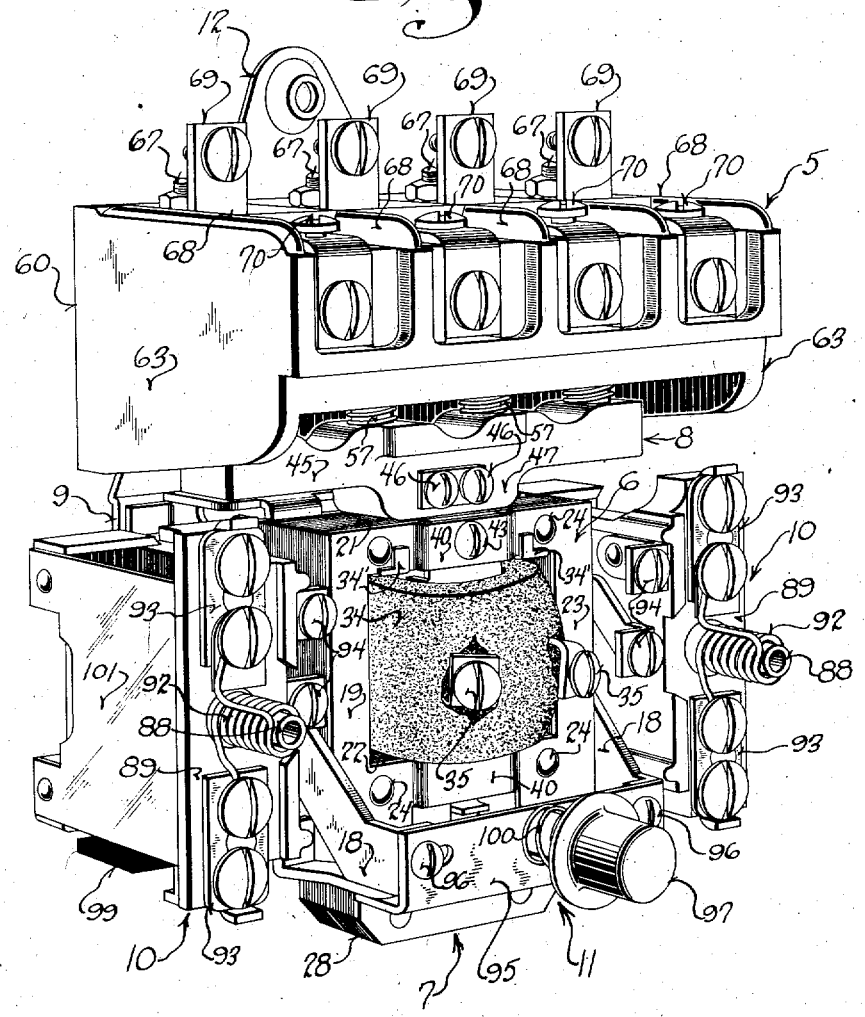
Figure 1 is a perspective view of the complete switch.
Figure 15:
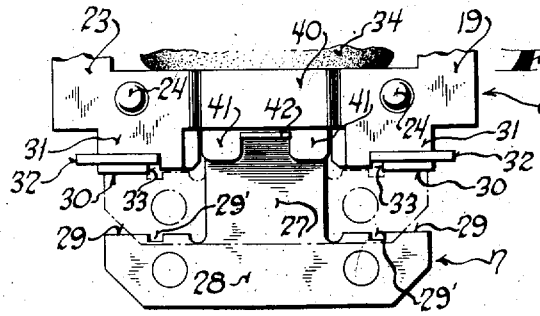
Figure 15 is an enlarged detail view to show the construction of the meeting portions of the laminated field piece and armature.

Referring now more particularly to the accompanying drawings in which like numerals indicate like parts throughout the several views, it will be seen that the switch of this invention comprises essentially a stationary contact assembly indicated generally by the numeral 5, and an electromagnet assembly 6, which includes a core armature 7 and a movable contactor unit 8.

In a manner to be more fully described hereinafter, both the electromagnet assembly 6 and the stationary contact assembly 5 are mounted on a single rigid supporting bracket or frame 9 with the stationary contact assembly disposed above the magnet assembly and with the entire structure substantially symmetrical about the vertical axis of the armature 7.

The bracket 9 is in fact an integral part of the electromagnet as will be hereinafter more fully described, and also mounts a pair of thermal overload relays 10 on its opposite sides and a resetting device indicated generally by the numeral 11, across its front for operative association with the relays. Fixed to the back of the mounting bracket is a back plate 12 by which the completely assembled switch may be secured to a panel or other suitable support. This back plate 12, however, may be omitted if desired and the mounting bracket secured directly to the back of an enclosing cabinet or other support (not shown).

Figure 10:
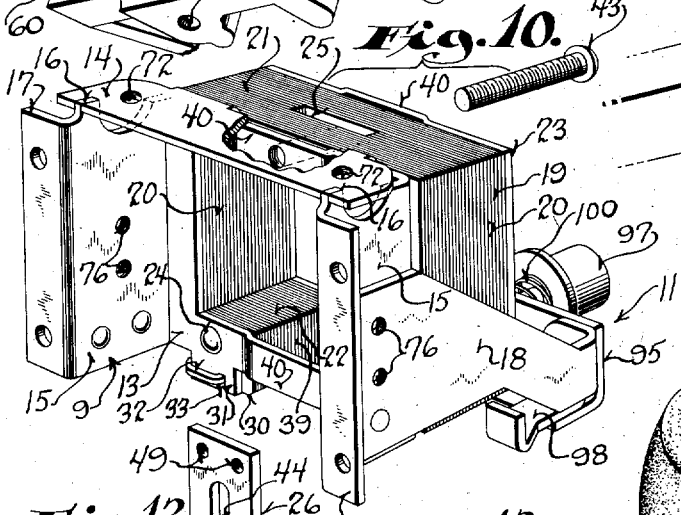
Figure 10 is a perspective view of the laminated field piece showing the mounting bracket and the other elements which are rigidly attached thereto, and the securing screw which serves to hold the armature and its guideways assembled with the laminated field piece.
Figure 11:
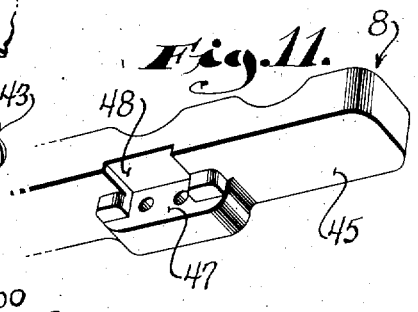
Figure 11 is a perspective view of a portion of the contactor carrier to illustrate particularly the manner of its attachment to the armature.

The mounting bracket or frame 9, which may be considered the skeleton of the switch, as all of its various elements are attached thereto, is formed of sheet metal, and as best illustrated in Figure 10, has a substantially rectangularly apertured front wall 13, a top wall 14 in the form of a horizontal shelf or flange directed at right angles to the wall 13, and spaced side walls 15 bent rearwardly from the side edges of the front wall and secured by welds or other suitable means to the top wall as at 16.

The rear edges of the side walls 15 have outwardly extending flanges 17 by which the frame is secured to the back plate 12 or directly to the supporting surface. The side walls 15 also have forwardly and downwardly extending arms 18 rigidly fastened thereto to mount at their outer ends the reset mechanism 11. The construction of the reset mechanism and the manner of mounting the same from the outer ends of the arms 18 will be hereinafter described.

The front wall 13 of the supporting bracket, as stated, is apertured to define a rectanglar frame coextensive in size to the laminated field piece 19 of the magnet assembly 6. The laminated field piece 19 is composed of a plurality of laminations of generally inverted U-shape having side members 20 connected by a closed upper end portion 21. The lower ends of the side members 20 are directed inwardly for a distance to define ledges 22, but are spaced apart sufficiently far to leave an opening to receive the armature 7.

The laminations of the laminated field piece are clamped between the front wall 13 of the mounting bracket and a substantially rectangular hollow frame member 23 coextensive in size to the front wall 13, and secured thereto by rivets, or other suitable securing means 24. The mounting bracket thus forms an integral part of the laminated field piece.

A few of the middle laminations of the laminated field piece are divided at their upper ends so as to provide a narrow slot or opening 25 through which an extended end portion 26 on the armature 7 projects.

Figure 12:
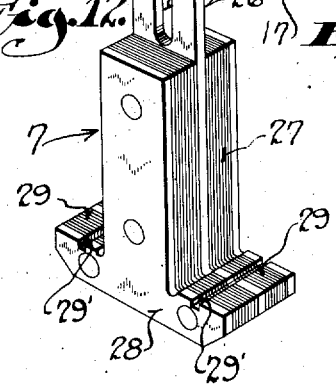
Figure 12 is a perspective view of the armature.

The armature, as clearly illustrated in Figure 12, is built up of substantially T-shaped laminations so that the armature consists of a vertical stem 27 and a horizontal head 28, the head being at the bottom of the armature. The outer and innermost laminations are of heavier stock and the inner lamina extends beyond the adjacent ends of the other laminations to provide the projected end portion 26, which as stated, extends through the opening 25 in the upper closed end of the laminated field piece.

The inner surfaces of the armature head 28 are machined to lie in a common plane and provide armature pole faces 29. These faces are adapted to seat against pole faces 30 on the bottom of the field piece 19. The pole faces 30 of the field piece are the bottom surfaces of extensions 31 projecting down from the bottom of the field piece generally.

Figure 2:
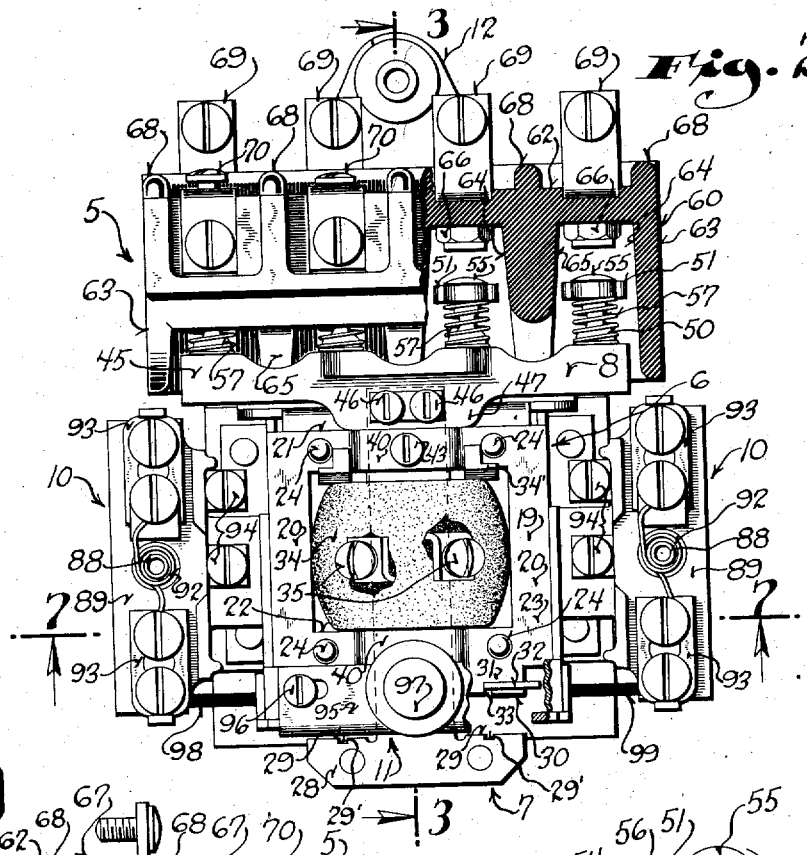
Figure 2 is a front elevation of the switch with parts broken away and in section to illustrate structural details.
Figure 3:
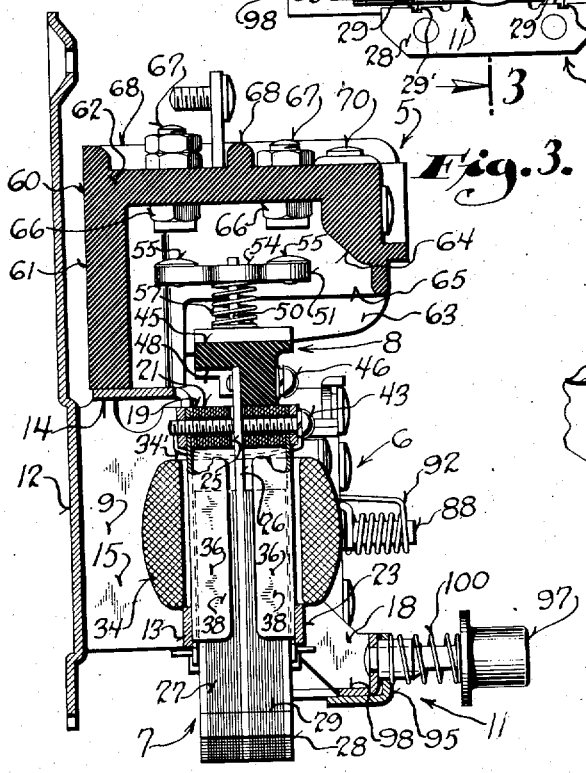
Figure 3 is a vertical section through the switch taken on the plane of the line 3—3 of Figure 2.

The provision of the downward extensions 31 on the bottom of the laminated field piece, facilitates the machining of the laminated field piece pole faces and insures accurate engagement of the faces 29 therewith. The application of shading coils 32 to the laminated field piece pole pieces is also facilitated by the extensions 31. These coils are secured in position by being engaged in slots 33 cut up into the extensions 31 from their bottom faces, as best shown in Figure 2.

It is to be noted that the armature pole faces 29 are transversely grooved as at 29′ in line with the slots 33. The provision of these grooves 29′ precludes the formation of upset ribs on the faces by their continuous impingement on the slotted faces 30, which ribs, if formed, might have a tendency to prevent perfect seating.

To further insure perfect seating, those portions of the laminated field piece pole faces 30 which lie outside the shading coils are on a plane inwardly of the portions encircled by the coils, so that the areas of actual contact lie entirely within the shading coils and are at the extremities of the armature head.

Attention is directed to the location of the rivets 24, which tie the laminations of the laminated field piece together. These are placed so as to provide maximum mechanical strength and a minimum of electrical loss. The two lower rivets are directly above the sealing surfaces of the laminated field piece or areas of impact between the laminated field piece and the armature and the two upper rivets are located on opposite sides of the opening 25 through which the armature portion 26 projects.

Disposed within the hollow of the laminated field piece is a coil 34. This coil is of such size that it fits easily in the hollow of the laminated field piece and is readily positionable therein through the open front of the laminated field piece. Terminals 35 are carried directly by the coil to permit the same to be connected in circuit for energization.

The coil is retained in position by a pair of opposed armature guideways 36 removably secured in the laminated field piece. The guideways 36 not only serve to detachably retain the coil in position, but also provide smooth guide tracks in which the armature slides, and thus positively preclude restrictive engagement between the armature and the coil. If desired, the two guideways may be formed as one integral unit, being joined at one side and separated at the opposite side.

Figure 13:
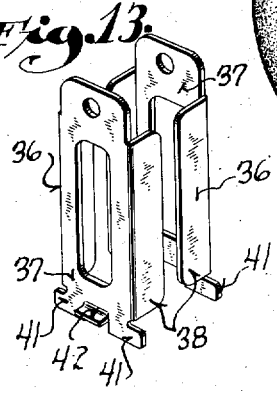
Figure 13 is a perspective view of the two opposed guideways removably secured in the laminated field piece to guide the armature in its vertical movement.
Figure 14:
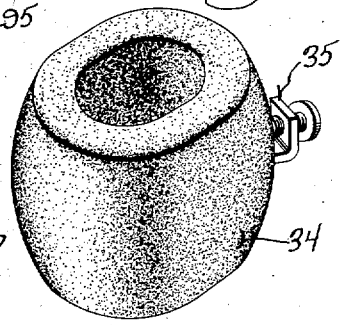
Figure 14 is a perspective view of the magnet coil.

As best shown in Figure 13, the guideways 36 are channel-shaped in horizontal cross section, having webs 37 and flanges 38 directed at right angles from the side edges of the webs. The width of the guideways is such that they fit snugly between the inner faces 39 of the ledges 22 at the bottom of the laminated field piece.

The upper and lower portions of the wall 13 and the front frame 23 are offset as at 40 opposite the opening 25 and the space between the lower ends of the laminated field piece. These offsets are sufficient to accommodate the thickness of the webs 37 of the guideways, the upper ends of which project into the space between the offset portions 40 opposite the opening 25 and the adjacent outer surfaces of the laminated field piece laminations. At their lower ends, the guideways have laterally projecting ears 41 to engage the adjacent side portions of the laminated field piece laminations. In this manner, the guideways are firmly held against lateral movement in any direction.

Outwardly extending ears 42 formed on the lower ends of the guideways provide means for withdrawing the same from the laminated field piece. Normally, however, disassembly of the guideways from the laminated field piece is prevented by a retaining screw 43, which passes through aligned openings in the upper closed end of the laminated field piece, the upper ends of the guideways and an elongated slot 44 in the projected end 26 of the armature. This single retaining screw 43 thus serves to readily removably hold the armature, its guideways, and the coil assembled with the laminated field piece.

The magnet assembly is thus readily built up and assembled with the supporting frame 9 and inasmuch as the laminated field piece itself through the guideways 36 mounted therein, guides the armature for its movement, it is evident that no adjustment whatever is necessary to insure accurate seating of the armature on the laminated field piece pole faces.

To avoid sticking of the armature in its guideways due to the magnetic attraction between it and the magnet, the guideways are formed of a non-magnetic metal, preferably a non-magnetic steel alloy. For the same reason, the central lamina, which projects upwardly from the end of the armature to provide the projected end 26, which passes through the opening 25, is also formed of a non-magnetic steel alloy.

A steel alloy is particularly well suited to this purpose as it has the required strength and being non-magnetic, it has the added advantage of a minimum of no eddy current losses.

To prevent vertical or endwise movement of the coil 34, two flat springs 34' are confined between the upper end of the coil and the adjacent inner wall of the laminated field piece. The extremities of the springs are directed upwardly to engage over the outer sides of the front frames 23 and the wall 13. The movable contactor unit, which is indicated generally by the numeral 8, consists merely of a cross bar 45 of insulating material preferably molded to shape, and directly attachable to the extended end portion 26 of the armature. The engagement of the cross bar 45 to the armature extended end 26 is effected by two screws 46 passed through aligned openings in a downward projection 47 on the cross piece. The downward projection is recessed as at 48 to receive the end of the armature projection 26 and properly align the screws with threaded openings 49 in the projection 26.

The assembly of the movable contactor unit to the armature thus requires merely the insertion of two screws.

Figure 8:
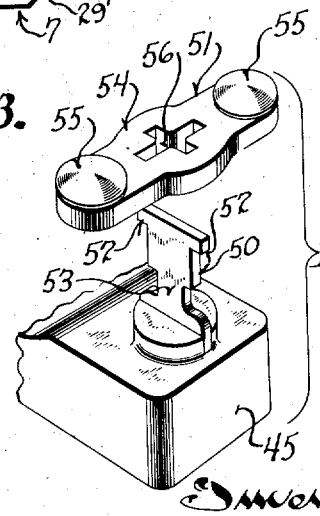
Figure 8 is a detail perspective view of the movable contactor and an adjacent portion of the carrier to show the manner of attaching the contactor.
Figure 4:
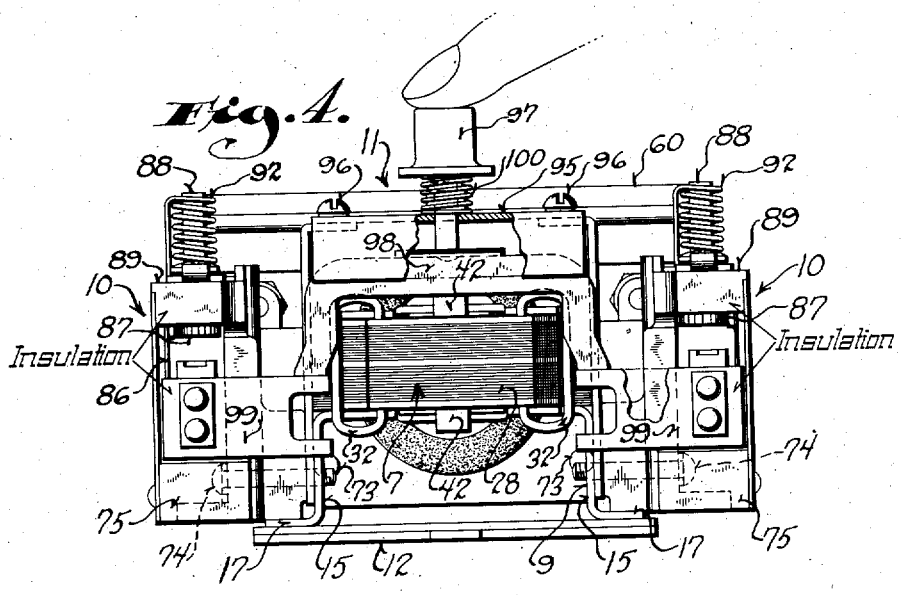
Figure 4 is a bottom view of the switch showing the manner of resetting the overload relays.

Projecting from the top face of the cross piece 45 and preferably secured thereto by being imbedded directly therein, are upstanding posts 50 to mount the individual contactors 51. As best illustrated in Figure 8, the manner of attaching the contactors to the posts is such that the contactors are readily detachable to permit renewal. For this purpose, the posts are substantially T-shaped to provide shoulders 52 at their outer ends, and their stems are reduced in width to form narrow necks 53.

The contactors consist of metal cross bars 54 to the ends of which contacts 55 are secured. A cross shaped opening 56 is formed through the metal cross bars, the legs of which are of unequal length with the legs of greatest length extending longitudinally with respect to the cross bar. These longer legs of the opening 56 are large enough to permit the passage of the heads of the T-shaped posts therethrough and the short legs of the openings are of a size slightly greater than the width of the stem so that when assembled with the posts, the shoulders 52 prevent disassembly.

The manner of engaging the cross bars 54 with the posts 50 is quite evident from Figure 8. As here shown, it is only necessary to turn the cross bars 54 at right angles to their normal positions and engage the long slots of their cross shaped openings 56 over the head of the post and move the same downwardly sufficiently far to align the bar with the narrow neck 53, whereupon the bar may be turned ninety degrees to its operative position. Compression springs 57 confined between the cross bars 54 and the upper surface of the carrier 45, serve to hold the cross bars up against the shoulders 52 and provide contact pressure.

The stationary contact assembly 5 consists of a block of insulating material 60 having a flat rear wall 61, a top wall 62 disposed at right angles thereto, and side walls 63. The underside of the top wall is recessed to define a plurality of arc quenching chambers 64 separated from each other by partitions 65. Mounted within each chamber 64 are two stationary contacts 66. These contacts consist preferably of screws 67 having contact points of suitable metal secured to their heads. The contacts in each chamber are of course electrically insulated, and are adapted to be electrically bridged by their contactor upon engagement therewith.

The outer face of the top wall is formed with a series of ribs or partitions 68 to provide pockets in which line terminals 69 and motor terminals 70 are mounted, the terminals being secured to the block by the screws 67, which, as stated, form part of the contacts.

A simple mounting for the contacts and terminals is thus afforded, and, as will be readily apparent, the top of the block forms a terminal board which, because of its accessibility, greatly facilitates the connection of the various conductors to the switch.

The rear wall 61 of the insulated block has two vertical counterbored openings 71 extending therethrough, which are spaced apart exactly the same distance as two threaded holes 72 in the top wall or flange 14 of the mounting bracket 9. Screws 73 extending down through the counterbored openings 71 in the block and threaded in the holes 72 secure the block and consequently the entire stationary contact assembly to the mounting bracket 9. Inasmuch as the holes 72 are accurately located with respect to the laminated field piece and as the armature is guided for movement by the laminated field piece and the movable contactor unit is carried directly by the armature, this manner of mounting the insulating block automatically secures proper alignment between the stationary contact assembly and the magnet assembly.

The chambers formed on the underside of the insulated block have an arc quenching effect similar to that obtained in the Patent No. 1,804,729, granted to Gustav O. Wilms and Frederick F. Loock.

The thermal overload relays 10 are conveniently attached to the side walls 15 of the mounting bracket 9 by screws 74 passed through the insulating bodies 75 of the relays and threaded in holes 76 in the side walls 15. The holes 76 also pass through the adjacent inner ends of the supporting arms 18.

The thermal overload relays 10 are of novel construction and comprise a pair of stationary contacts 77 fixed to the supporting wall or body 75 and adapted to be electrically bridged by a movable contact 78. The contactor 78 is pivotally mounted to the end of an insulated arm or lever 78′ pivotally mounted on a stud 79 fixed to the body 75.

Also pivotally mounted on the stud 79 is a substantially U-shaped member 80 between the extremities of which the lever 78′ is positioned. A torsion spring 81 coiled about the stud 79 with one end bearing against the member 80 and its other end hooked about the lever 78′ yieldably urges the lever to its contact closing position.

Figure 5:
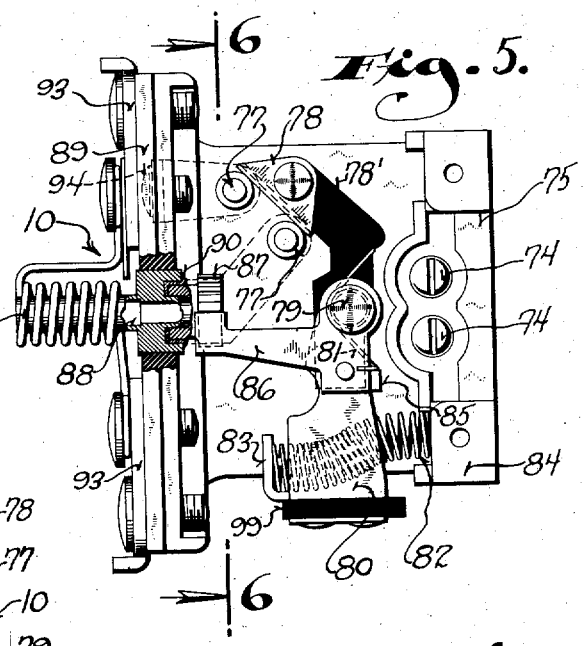
Figure 5 is an enlarged detail view of one of the thermal overload relays shown separated from the rest of the switch.

A comparatively heavy coil spring 82, confined between an upturned lug 83 on the member 80 and an abutment 84 formed as part of the supporting body 75 normally yieldably tends to turn the member 80 about the axis of the stud 79 in a clockwise direction with respect to Figure 5. Upon such movement of the member 80 the lever 78′ is carried to its contact breaking position by an ear 85 formed as part of the member 80 and engageable with the inner end of the lever 78′.

Thermally controlled means are provided to hold the member 80 in its potentially active position. This means consists of a spring finger 86 rigidly secured to the member 80 and forming a pawl engageable with a ratchet wheel 87. The ratchet wheel 87 is journalled on the inner end of a tubular stem 88 mounted in the front wall 89 of the mounting body 75. Normally the ratchet wheel 87 is secured to the stem 88 by solder 90, or some similar metal having a low fusion point, so that the engagement of the spring arm 86 therewith holds the member 80 against movement by its spring 82. The outer end of the stem 88 projects beyond the front wall 89 and has a heater coil 92 encircling it. The ends of the coil are electrically and mechanically connected to terminals 93 to be conveniently connected in its proper circuit.

Upon an overload in the circuit in which the coil is connected, the temperature rise produced therein and conducted by the stem 88 to the solder 90 melts the same and releases the ratchet wheel 87, thus permitting the relay to trip, breaking the circuit across the contacts 77. To facilitate connecting the contacts 78 in the proper circuit, they are provided with terminals 94.

To reset the relays, after having been tripped, is the function of the mechanism indicated generally by the numeral 11. This mechanism, as hereinbefore stated, is mounted on the outer ends of the supporting arms 18 and comprises a right angular cross piece 95 attached by screws 96 to the ends of the arms 18 and slidably mounting a push button 97. The stem of the push button has a yoke 98 attached thereto, the ends of which are adapted for engagement with arms 99 of insulating material secured to the closed outer ends of the members 80.

A compression spring 100 coiled about the stem of the push button and confined between the button and the cross piece 95 yieldably holds the yoke in its inoperative extended position spaced sufficiently far from the arms 99 so as not to restrict their movement during tripping of the relay.

Figure 6:
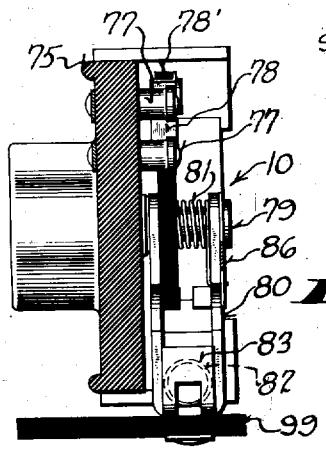
Figure 6 is a section view through the relay taken on the plane of the line 6—6 of Figure 5.
Figure 7:
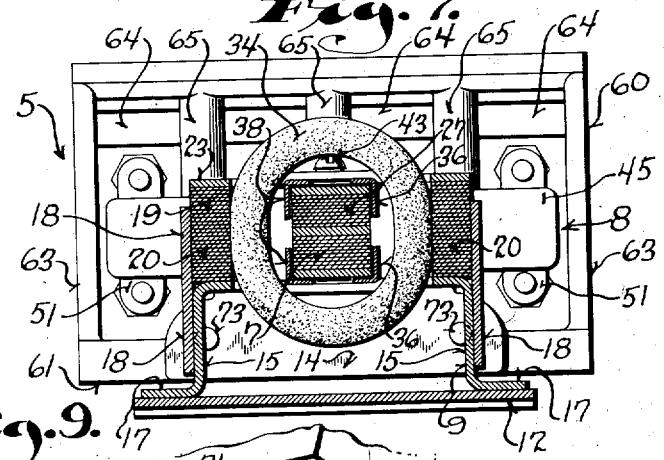
Figure 7 is a horizontal section view looking up into the switch on the plane of the line 7—7 of Figure 2, but with the overload relays detached.
Figure 9:
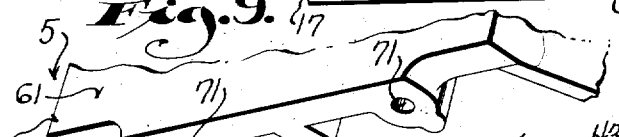
Figure 9 is a perspective view of the lower portion of the stationary contact mounting member.

To reset either or both relays it is only necessary to depress the push button, which action, taking effect through the yoke and the arms 99, moves the members 80 about their pivotal mountings to their normal set positions. The mechanism of the relays is preferably enclosed by a cover 101 of thin insulating material. Figures 5 and 6 show the relay with this cover removed.

Mounting the overload relays and the re-set mechanism on the supporting bracket as described, affords a very practical and efficient construction and insures accurate alignment between the relays and the re-set mechanism.

The mounting of the heater coils as shown and described on the front of the relays facilitates removal and replacement of the coils, as the screws holding the coils in place are readily accessible from the front of the switch.

While the particular construction of the overload relays is the separate invention of Gustav O. Wilms and forms the subject matter of the copending application, Serial No. 725,447, filed May 14, 1934, it has been shown and described herein to more adequately define the present invention.

From the foregoing description taken in connection with the accompanying drawings, it will be readily apparent to those skilled in the art to which this invention appertains, that this invention provides an electromagnetically operable switch of novel design and construction, and that by this novel design and construction compactness and simplicity are assured.

It is also evident that the manufacture of the switch is materially facilitated as all of the various sub-assemblies may be entirely built up in individual production units, and then brought to a final assembly department where the insertion of but a few screws completes the entire assembly without requirement for costly lining up of the coacting elements.

It is also evident that by reason of the complete elimination of levers, cams and similar wearing joints and connections, the switch has an exceptionally long life. In fact, the only real wear during use is confined to the readily replaceable stationary and movable contacts.

What we claim as our invention is:

1. An electromagnetically operated switch comprising an electromagnet having a laminated field piece, an operating coil mounted within the field piece, an armature guided for axial sliding movement in a fixed path through the field piece and the operating coil, a movable contactor carried by the armature to be movable therewith, a stationary contact, a member to which the stationary contact is rigidly attached, and means of attachment to mount the entire device to which the field piece is directly and permanently fixed and to which said member is directly securable in a predetermined position with respect to the field piece so that the contact carried thereby is automatically aligned with the contactor upon the attachment of said member to the means of attachment.

2. In an electromagnetically operated switch, a stationary contact assembly comprising, an insulating member having arc quenching pockets, contacts in said pockets and terminals for the contacts mounted directly on the exterior of the said insulating member, an electromagnet assembly having a laminated field piece, a coil disposed in the field piece, and an armature guided for axial sliding movement through the field piece and coil, a movable contactor unit carried by the armature to be moved thereby toward and from the stationary contact assembly, said movable contactor unit having contacts movable into the pockets of the stationary contact assembly to engage the contacts therein, and a single rigid supporting member forming a permanent part of the field piece and to which the stationary contact assembly is directly secured to insure alignment between the contacts.

3. In an electric switch, an electromagnet assembly including a laminated field piece, an operating coil mounted within the field piece and an armature guided through the coil by the field piece, means of attachment to mount the entire device rigidly secured to said field piece to form an integral part thereof and having a hole in a portion thereof accurately located with respect to the field piece and the path of movement of the armature, a movable contactor unit carried by the armature and movable therewith in a fixed path, a stationary contact assembly including contacts and a member to which said contacts are secured, and means to mount the stationary contact assembly on said means of attachment including an element engaged with the member to which the stationary contacts are secured and received in the hole in said means of attachment, the engagement of said element in the hole lining up the stationary contact assembly with the movable contactor unit.

4. In an electric switch, means of attachment to mount the entire device having two angularly disposed walls, a laminated field piece fastened directly and permanently to one of said walls so that said wall forms an integral part of the field piece, an operating coil mounted in the field piece, an armature guided for axial sliding movement through the field piece and the coil and parallel to said wall, a movable contactor carried by said armature to be movable therewith, a stationary contact, and means to mount the stationary contact from the other of said walls in line with the movable contactor.

5. In an electromagnetically actuated switch, means of attachment to mount the entire device having angularly disposed walls, a laminated field piece assembled on one of said walls which is substantially coextensive in size and shape to the field piece laminations, said field piece being provided with a substantially vertical passage therethrough, an armature slidably disposed in said passage, a movable contactor unit carried by the armature upper end, and a stationary contact assembly secured to the other of said angularly disposed walls with its contacts arranged for engagement by the contacts of the movable contactor unit.

6. In an electromagnetically operated switch, a rectangular laminated field piece having a gap in the middle of one side thereof, an armature core composed of a plurality of laminations secured together, a central one of said laminations projecting beyond the adjacent ends of the others to provide means for attaching a movable contactor carrier to the armature, said armature being substantially T-shaped in form, having a shank and a head, said shank being movable in said gap so that a variable spacing occurs between the end of said shank beyond which said central lamination projects and the interior of said field piece and a nonvariable spacing occurs between the sides of said shank and the sides of said gap, and pole faces arranged one on each side of said gap and forming a part of said field piece for engaging opposite inner faces of the head of said T-shaped armature.

7. In an electromagnetically operated switch, a substantially rectangular laminated field piece having a medially arranged gap in one of its sides and a narrow opening through its upper closed end portion oppositely placed with respect to said gap, oppositely arranged pole faces one on each side of said gap, a substantially T-shaped armature having a shank and a head, said shank being slidably disposed within said gap, said armature being composed of a plurality of laminations secured together and one of its medial laminations extending beyond the others at the end of said shank to project through the narrow opening in the upper closed end of the field piece, and pole-face-meeting-surfaces oppositely disposed upon either inward side of said head, which surfaces come into contact with said pole faces at the inner limit of travel of said armature.

8. In an electromagnet, a laminated field piece composed of a plurality of substantially U-shaped laminations assembled between two hollow rectangular members, a coil disposed between the side arms of the field piece, said coil being readily positionable between the side arms of the field piece through the opening of one of said members, an armature movable between the side arms of the field piece and through the center of the coil, and armature guiding track removably secured in the field piece to guide the armature for movement and to detachably secure the coil assembled with the field piece.

9. In an electromagnetically actuated switch, a laminated field piece of substantially U-shape and having an opening through its closed end, a coil disposed between the side legs of the field piece, an armature slidable between the side legs of the field piece through the center of the coil and having a part projecting through the opening in the closed end of the field piece, guideways removably disposed between the side legs of the field piece to guide the movement of the armature and retain the coil assembled with the field piece, and common means to retain the guideways and the armature assembled with the field piece.

10. In an electromagnetically operated switch, a laminated field piece of substantially U-shape having an opening through its closed end, a coil disposed in the space between the side legs of the field piece, guideways removably positioned between the side legs of the field piece and extending up through the hollow of the coil to retain the coil assembled with the field piece, said guideways having portions overlying the sides of the closed end of the field piece, an armature slidable in said guideways and having an extended end portion projecting through the opening in the closed end of the field piece, a movable contactor carrier attached to said extended end portion of the armature, and a retaining member passed through aligned openings in the closed end portion of the field piece, the projected portions of the guideways and an elongated slot in the extended end portion of the armature to retain the guideways and armature assembled with the field piece.

11. In an electromagnetically operated switch, a laminated field piece comprising a plurality of substantially U-shaped laminations assembled between two hollow rectangular members, a coil disposed between the side arms of the U-shaped field piece and adapted to be so positioned by passage through one of said rectangular members, guideways removably secured between the side legs of the field piece and extending through the hollow of the coil to retain the coil assembled with the field piece, an armature guided for axial movement by said guideways, and yieldable means confined between one end of the coil and an adjacent portion of the field piece to hold the coil against an opposite portion of the field piece to retain the same against axial movement.

12. In an electromagnetically operable switch, a laminated field piece including a plurality of laminations secured between two substantially flat sheet metal members, said field piece having a passage therethrough for the reception of an armature, an armature slidable in said passage and having a part projecting beyond one end of the field piece, a movable contactor assembly mounted on said part of the armature to be movable with the armature, an angularly disposed flange on one of said flat sheet metal members adjacent the end of the field piece from which the armature projects forming means of attachment for mounting the entire device, and a stationary contact assembly secured to said angularly disposed flange with its contacts in line with the contacts of the movable contactor assembly.

13. In an electromagnetically operable switch, an electromagnet assembly including a supporting laminated field piece as a permanent part thereof and a movable armature, a stationary contact assembly comprising a block of insulating material recessed at its underside to provide an arc quenching chamber, a contact carried by said block and located on the top wall of said chamber, means to secure said block to the laminated field piece of the electromagnet assembly, and a movable contactor carried by the armature and movable up into said arc quenching chamber to engage the contact therein.

14. In an electromagnetically operable switch, an electromagnet assembly comprising a laminated field piece, an armature movable in the field piece, and a supporting frame rigidly and permanently attached to the field piece to form an integral part thereof, a stationary contact assembly comprising a block of insulating material recessed at its underside to define a plurality of separated arc quenching chambers, stationary contacts secured in said arc quenching chambers, a plurality of movable contactors engageable with the stationary contacts, a contactor carrier attached to the armature of the electromagnet assembly to move the contactors into and out of said chambers for engagement with the contacts therein, and means to secure said block of insulating material to the supporting frame of the electromagnet with its stationary contacts properly aligned with the movable contactors.

15. In an electric switch, a stationary contact assembly comprising an insulating member shaped to define a plurality of separated arc quenching chambers substantially closed on all sides save the bottom, stationary contacts mounted on the inner walls of said arc quenching chambers, and terminals for said contacts mounted directly on the exterior of said insulating member.

16. In an electric switch, a stationary contact assembly comprising an integral member of insulating material shaped to define arc quenching chambers substantially closed on all sides save the bottom, contacts within said chambers, terminals for said contacts mounted directly on the exterior of said member, and common means to secure said contacts and terminals to said member and electrically connect the same.

17. In an electric switch, a stationary contact assembly comprising an integral block of insulating material recessed on its underside to define a plurality of separated arc quenching chambers substantially closed on all sides save the bottom, a pair of electrically spaced contacts in each of said chambers, terminals on one external face of said block of insulating material electrically connected to said contacts, whereby said external face of the block serves as a terminal board for the switch, and contactors movable into said chambers to engage and electrically bridge the contacts therein.

18. In an electromagnetically operated device, an electromagnet having a rectangular laminated field piece with a medial gap in one of the rectangular sides, pole faces adjacent said gap, a T-shaped armature having a head and a shank, said shank being guided for movement through said gap in parallel relation to the sides thereof, so that opposite inner sides of said head of said armature are movable upon energization of the electromagnet into engagement with said pole faces, an instrumentality carried by the armature to be movable therewith in a definite path, and another instrumentality carried directly by the field piece of the electromagnet to be in direct alignment with the armature carried instrumentality and to be engageable thereby to perform a predetermined function.

19. In an electromagnet device, a field piece comprising laminations assembled between two rigidly connected members, one of said members having means of attachment to mount the entire device on a support and having means to directly mount instrumentalities associated with the electromagnet.

20. In a device of the character described, a laminated field piece, end plates between which the field piece is permanently assembled, a supporting flange on one of said end plates forming means of attachment to mount the entire device, and to afford a base for an instrumentality associated with the field piece, whereby such instrumentality upon attachment to said base has an accurate, definite, relative position with respect to the field piece.

21. In a device of the character described, a laminated field piece assembled between end members which are rigidly secured thereto, an armature guided by the field piece for movement in a fixed path, an instrumentality carried by the armature and movable therewith in a fixed path, a second instrumentality cooperable with the armature-carried instrumentality to effect a predetermined function, and means carried by one of said end members to form means for attachment to mount the entire device and to mount the second instrumentality and insure proper alignment with the armature carried instrumentality.

22. In a device of the character described, a laminated field piece assembled between end members which are rigidly secured thereto, an armature guided by the field piece for movement in a fixed path, an instrumentality carried by the armature and movable therewith in a fixed path, a second instrumentality cooperable with the armature-carried instrumentality to effect a predetermined function, means carried by one of said end members to mount the second instrumentality and insure proper alignment with the armature-carried instrumentality, and means carried by said designated end member attached to a support to mount the entire device from said support.

23. In an electromagnetically operated device, comprising a laminated field piece provided with a pole face, an armature cooperating with the field piece and having a pole face engageable with the field piece pole face, said field piece having a slot extending inwardly from its pole face, and a shading coil in said slot, the armature pole face being grooved in line with the slot of the field piece to preclude the formation of a raised rib on the armature pole face by continued impingement thereof on the slotted portion of the field piece pole face.

24. In an electric switch, a stationary contact assembly comprising an insulating member shaped to define a plurality of separated arc quenching chambers substantially closed on all sides save the bottom, stationary contacts mounted on the inner walls of said arc quenching chambers, terminals for said contacts disposed on the exterior of said insulating member, certain of said terminals having portions thereof bent down over the front wall of said insulating member and other terminals having portions thereof bent upwardly to project substantially vertically from the top wall of said insulating member, and terminal screws threaded in said downwardly and upwardly directed portions of the terminals so that the heads of all of the screws face the front of said insulating member.

25. An electromagnet comprising a hollow laminated field piece, an operating coil provided with an opening through its center disposed in the hollow of said field piece, and means to readily detachably secure the coil to the field piece, comprising opposed channel-shaped guides extending through the opening of the coil with their ends readily detachably engaged with the field piece.

26. In an electromagnet, the combination of a laminated field piece having a coil-receiving opening, an operating coil disposed in said opening and having an opening through its center, an armature movable through the opening in the coil, and common means for guiding the armature and securing the coil in the field piece comprising a pair of guides substantially U-shaped in cross section extending through the opening in the coil with their ends engaging the field piece.

27. In an electromagnet, the combination with a hollow magnetic field piece, an armature and an operating coil having an opening through its center, of means to guide the armature for movement through the coil and also secure the coil within the field piece comprising a pair of guides channel-shaped in cross section extending through the coil and secured to the field piece.

28. In an electromagnetically-actuated switch, a core armature composed of a plurality of laminations secured together, a central one of said laminations consisting of a non-magnetic ferrous alloy projecting beyond the adjacent ends of the others to provide means for attaching a movable contactor carrier to the armature.

29. In an electromagnetically-operated switch, a substantially inverted U-shaped laminated field piece having a narrow opening through its upper closed end portion, an armature slidably disposed between the side legs of the field piece, said armature being composed of a plurality of laminations secured together, and one of its medial laminations consisting of a nonmagnetic ferrous alloy extending beyond the others to project through the narrow opening in the upper closed end of the field piece whereby a movable contactor carrier may be attached to said projected lamination of the armature.

30. In an electromagnet, a laminated field piece composed of a plurality of substantially U-shaped laminations assembled between two hollow rectangular members and having a narrow opening through its upper closed end portion, a coil disposed between the side arms of the field piece, said coil being rigidly positioned between the side arms of the field piece through the opening of one of said members, an armature movable between the side arms of the field piece and through the center of the coil, said armature being composed of a plurality of laminations secured together, and one of its medial laminations consisting of a nonmagnetic ferrous alloy and extending beyond the others to project through the narrow opening in the upper closed end of the field piece, and armature guiding tracks removably secured in the field piece to guide the armature for movement and to detachably secure the coil assembly with the field piece.

31. In an electromagnetic switch, an electromagnet assembly including a laminated field piece, a movable armature and a supporting frame rigidly joined to the field piece and in itself providing a rigid support for the entire switch capable of direct attachment to a support, a stationary contact assembly including a member of insulating material and a contact carried by said member and located at the underside thereof, means to secure said member to the supporting frame of the electromagnet assembly in a definite fixed position with respect to the electromagnet assembly, and a movable contactor operable by the armature and guided by said electromagnet assembly for movement up into engagement with the stationary contact.

32. In an electromagnetically actuated switch, a stationary electromagnet assembly including a laminated field piece and a supporting frame rigidly joined to the field piece and in itself providing a rigid support for the entire switch capable of direct attachment to a support, a stationary contact assembly comprising a member of insulating material and a contact carried by said member and located at the under side thereof, means rigidly connecting said member with the supporting frame of the electromagnet assembly in a definite fixed position with respect to the electromagnet assembly, and a movable contactor assembly comprising an armature guided by said electromagnet assembly for movement toward and away from the stationary contact assembly, a movable contactor carrier solidly connected with the armature, and a contactor on said carrier adapted to be moved into and out of engagement with the stationary contact by the armature.

33. In an electromagnetically actuated switch, a movable contactor assembly comprising, a core armature composed of a plurality of laminations secured together, a central one of said laminations projecting beyond the adjacent ends of the others, a movable contactor carrier, and means securing the contactor carrier to the projecting portion of said central lamination, said means holding the carrier against rocking movement with respect to the armature.

34. In an electromagnetically actuated switch, a stationary electromagnet assembly including a field piece, a movable contactor assembly cooperating with the field piece and comprising, a core armature having a shank and a head portion integral therewith, whereby the core armature is substantially T-shaped and symmetrical about a longitudinal axis running centrally through the shank, said head portion being located to one side of the electromagnet and the unheaded portion of the shank extending toward the opposite side thereof, an insulated contactor carrier, and means rigidly securing the carrier medially of its length to the unheaded end of the shank with the major axis of the carrier normal to said longitudinal axis so that the composite assembly is symmetrical and balanced about said longitudinal axis.

GUSTAV O. WILMS.
ALBERT J. DAWE.